(12) United States Patent
Villot et al.

(10) Patent No.: US 10,312,811 B2
(45) Date of Patent: *Jun. 4, 2019

(54) METHOD TO RECOVER FROM CURRENT LOOP INSTABILITY AFTER CYCLE BY CYCLE CURRENT LIMIT INTERVENTION IN PEAK CURRENT MODE CONTROL

(71) Applicant: STMicroelectronics S.r.l., Agrate Brianza (IT)

(72) Inventors: Andrea Villot, Aosta (IT); Enrico Papa, Ariver (IT); Silvio Pepino, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,325

(22) Filed: Nov. 2, 2018

(65) Prior Publication Data

US 2019/0074766 A1 Mar. 7, 2019

Related U.S. Application Data

(63) Continuation of application No. 15/824,199, filed on Nov. 28, 2017, now Pat. No. 10,122,277, which is a
(Continued)

(51) Int. Cl.
*H02M 3/156* (2006.01)
*H02M 3/158* (2006.01)
(Continued)

(52) U.S. Cl.
CPC .............. *H02M 3/158* (2013.01); *G06F 1/26* (2013.01); *H02M 1/08* (2013.01); *H02M 1/32* (2013.01);
(Continued)

(58) Field of Classification Search
CPC ........ H02M 1/32; H02M 3/156; H02M 3/158; H02M 3/1588
See application file for complete search history.

(56) References Cited

U.S. PATENT DOCUMENTS 6,498,466 B1 12/2002 Edwards
9,098,103 B1 8/2015 Milanesi et al.
(Continued)

FOREIGN PATENT DOCUMENTS

CN 101064472 A 10/2007
CN 101964587 A 2/2011
CN 204089595 U 1/2015

OTHER PUBLICATIONS

Hari, Ajay, "Improve Power Converter Reliability Using Hiccup-Mode Current Limiting," Literature No. SNVA604, Texas Instruments Incorporated, 2011, 9 pages.

*Primary Examiner* — Fred E Finch, III
*Assistant Examiner* — Ishrat F Jamali
(74) *Attorney, Agent, or Firm* — Seed IP Law Group LLP

(57) ABSTRACT

A method detects current-limit events indicating a maximum current threshold of a switching converter has been reached, A compensation voltage is adjusted in response to the detected current-limit events, where the compensation voltage defines a duty cycle of the switching converter. A time for which no current-limit events have been detected is sensed, and the value of the compensation voltage adjusted in response to the detected time reaching a time step threshold.

20 Claims, 5 Drawing Sheets

Related U.S. Application Data continuation of application No. 14/986,406, filed on Dec. 31, 2015, now Pat. No. 9,837,903.

(51) Int. Cl.
  *G06F 1/26* (2006.01)
  *H02M 1/08* (2006.01)
  *H02M 1/32* (2007.01)
  *H02M 1/00* (2006.01)

(52) U.S. Cl.
  CPC ......... *H02M 3/156* (2013.01); *H02M 3/1588* (2013.01); *H02M 2001/0009* (2013.01); *Y02B 70/1466* (2013.01)

(56) References Cited

U.S. PATENT DOCUMENTS

| | | |
|---|---|---|
| 2006/0125454 A1* | 6/2006 | Chen ................ H02M 3/1588 323/282 |
| 2012/0201063 A1 | 8/2012 | Sugawara |
| 2013/0249511 A1 | 9/2013 | Kalje et al. |
| 2014/0139198 A1 | 5/2014 | Manlove et al. |
| 2014/0217999 A1 | 8/2014 | Wibben et al. |

* cited by examiner

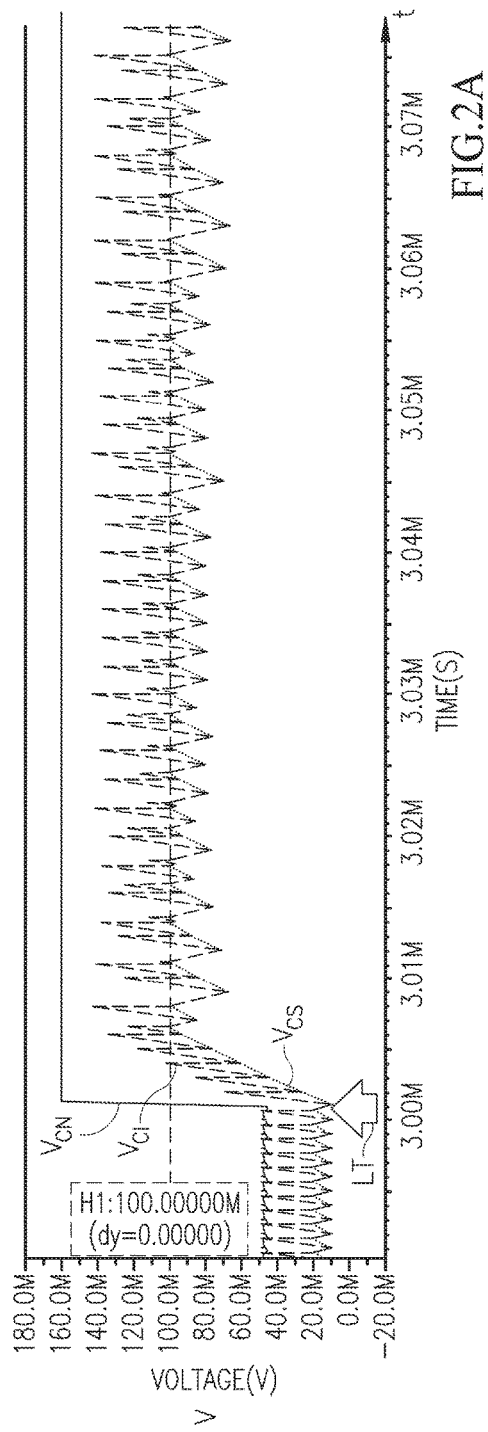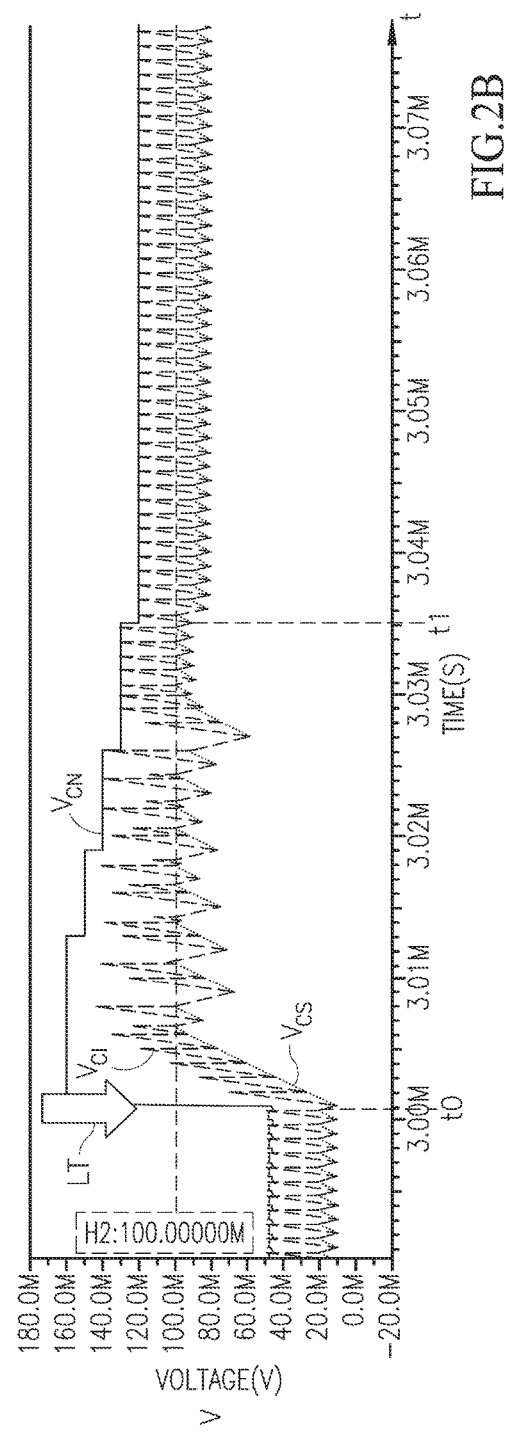

METHOD TO RECOVER FROM CURRENT LOOP INSTABILITY AFTER CYCLE BY CYCLE CURRENT LIMIT INTERVENTION IN PEAK CURRENT MODE CONTROL

BACKGROUND

Technical Field

The present disclosure relates generally to switching regulators, and more specifically, to methods, circuits and systems for maximum current threshold control of a switching regulator that maintains stability and reduces the occurrences of interruptions in normal switching operation of the switching regulator.

Description of the Related Art

A voltage regulator provides a regulated output voltage to a load from a voltage source that may be poorly regulated or fluctuates. A switching voltage regulator provides not continuous current from the voltage source to a load but instead provides current pulses from the voltage source to the load. The voltage regulator includes a switching circuit, typically including at least one power transistor, coupled to the load and this switching circuit is controlled to alternately store electrical energy in and discharge electrical energy from an inductive element. This electrical energy stored in and discharged from the inductive element is utilized to generate the regulated output voltage that is supplied to the load.

The switching circuit has a switching cycle SC that includes a portion during which the switching circuit is turned ON and a portion during which the switching circuit is turned OFF. When the switching circuit is turned ON, energy from the voltage source is stored in the inductive element and when the switching circuit is turned OFF, energy is discharged from the inductive element. The duty cycle D of the voltage regulator is defined as the fraction of the switching cycle for which the switching circuit is turned ON, and is given by the time the switching circuit is turned ON divided by the period of the switching cycle. The switching voltage regulator controls the duty cycle D to thereby regulate the load or output voltage supplied to the load.

A switching voltage regulator typically includes two control loops for controlling the operation of the regulator. A voltage control loop generates a control voltage responsive to the value of the output voltage while an inner current control loop adjusts a peak current flowing through the inductive element based on the control voltage. The terms inductive element and inductor are used interchangeably in the present description to mean any suitable type of inductive circuit such as a single inductor, multiple inductors, a transformer, and so on. This current-mode control implemented by the current control loop typically detects a peak current through the inductor and turns OFF the switching circuit when the current reaches this peak current.

When peak current mode control is utilized in controlling the operation of a switching voltage regulator, an instability in the operation of the regulator inherently exists due to sub-harmonic oscillations when the duty cycle D of the regulator exceeds 50% (i.e., 0.5), as will be appreciated by those skilled in the art. Due to this inherent instability, when the duty cycle D exceeds 50% a current threshold for the peak current mode control has a value that is a function of the current through the inductor and a compensation signal. This compensation signal has rate of change or slope related to the rate of change of the current through the inductor each switching cycle and is accordingly referred to as slope compensation.

In addition to the just described peak current mode control, the current control loop of a switching voltage regulator also includes current limit control that controls switching if the current through the inductor exceeds a maximum current threshold. This functions to protect the inductor and regulator from damage that could result from allowing the current through the inductor to exceed this maximum current threshold. Large inductor currents could result, for example, where an overload condition such as a short circuit occurs across the load being driven by the switching voltage regulator. Conventional approaches to this maximum current threshold detect each switching cycle whether the inductor current exceeds the maximum current threshold for a number of switching cycles and, if so, then performing a restart of the voltage regulator.

The restart includes a period of time during which the switching operation of the voltage regulator is terminated followed by a "soft-start" of the voltage regulator. This soft-start is a mode of operation of the voltage regulator that controls currents flowing in the regulator during restart to prevent the relatively large currents that would otherwise flow during restart. For example, during restart of a switching voltage regulator a relatively large current could be demanded from the input voltage source of the regulator without this soft-start mode of operation. The soft-start mode prevents this from happening by gradually increasing the permissible current limit through the inductor over time during the soft-start mode.

While these conventional approaches utilizing restarts including the soft-start mode of operation do perform maximum current threshold control, there are undesirable consequences that result. One undesirable consequence resulting from a soft-start is that this soft-start mode of operation takes a relatively long time as the current allowed to flow through the inductor is gradually ramped up to its normal maximum permissible value. During most of this time the output voltage from the switching voltage regulator is not being regulated as desired and therefore can undesirably fluctuate, which could adversely affect the operation of electronic circuitry in the load being driven by the voltage regulator. Other undesirable consequences of such restarts are relatively high power dissipation in certain components of the regulator during an overload condition, necessitating certain components be oversized or the size of associated heat sinks increased accordingly. A technique known as foldback current limiting by which the maximum current limit threshold is reduced as the output voltage falls during an overload condition may also be utilized but this can result in unpredictable operation of the regulator, as will be understood by those skilled in the art. Accordingly, there is a need for improved techniques of performing maximum current threshold control in switching voltage regulators.

BRIEF SUMMARY

One embodiment of the present disclosure is a method of controlling a switching regulator that includes detecting current-limit events indicating a maximum current threshold has been exceeded. A compensation voltage is adjusted in response to the detected current-limit events, where the compensation voltage defines a duty cycle of the switching regulator. A time is detected for which no current-limit events have been detected and the value of the compensation voltage is adjusted to increase the duty cycle of the switching regulator in response to the detected time exceeding a time step threshold.

BRIEF DESCRIPTION OF THE SEVERAL VIEWS OF THE DRAWINGS

FIG. 2A is a graph showing subharmonic oscillations in the inductor current in the switching voltage regulator of FIG. 1 when a load transient occurs that causes IMAX events.

FIG. 2B is a graph showing the elimination of subharmonic oscillations in the inductor current in the switching voltage regulator of FIG. 1 when the maximum current control logic controls the compensation voltage and the load transient occurs.

DETAILED DESCRIPTION

Figure 1:
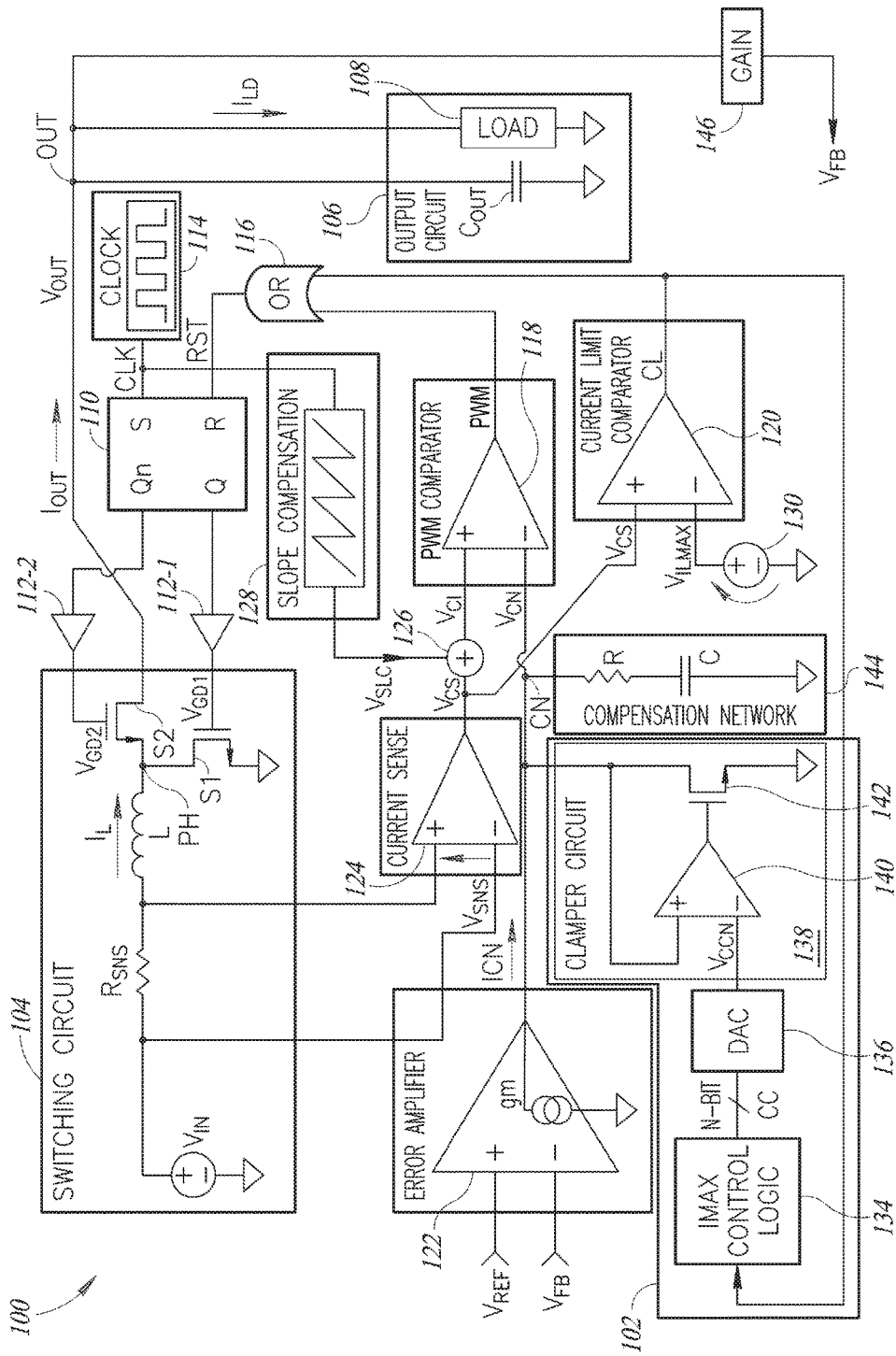
FIG. 1 is functional block diagram and schematic of a switching voltage regulator including a maximum current (IMAX) control circuit that controls a compensation voltage to reduce the occurrences of overcurrent events according to one embodiment of the present disclosure.

FIG. 1 is functional block diagram and schematic of one embodiment of a switching voltage regulator 100 that includes a maximum current (IMAX) control circuit 102 that controls a compensation voltage $V_{CN}$ to reduce the occurrences of overcurrent or current-limit events and switching cycle interruptions of the switching voltage regulator when load transients occur. In operation, the IMAX control circuit 102 detects the occurrence of current-limit events and controls the value of the compensation voltage $V_{CN}$ to eliminate the occurrence of such events without interrupting the switching cycles of the switching voltage converter 100. When no current limit events are detected for a certain number of switching cycles or a programmable amount of time, the IMAX control circuit 102 controls the compensation voltage $V_{CN}$ to return that voltage and thereby the operating current of the switching voltage regulator 100 to the nominal value for the operating current. The operation of the IMAX control circuit 102 will be described in more detail below. In this way, the IMAX control logic 102 eliminates the need to interrupt the switching cycles of the converter 100 when instability of converter occurs. This eliminates the need to turn OFF and restart the converter in response to the occurrence of such instability and thereby avoids the negative consequences inherent to such restarts as previously described.

In the following description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

In the example embodiment of FIG. 1, the switching voltage regulator 100 includes a switching circuit 104 having a boost topology. The switching circuit 104 may have any suitable topology depending on the application of the switching voltage regulator 100, and thus may have a Buck, Buck-boost, or other suitable topology. The switching circuit 104 receives a direct current (DC) input voltage source Vin, which may correspond to a rectified DC voltage derived from an alternating current (AC) electrical mains supply (not shown). First and second switches S1 and S2 are connected in series between an output node OUT and ground and are alternately activated to store electrical energy from the input voltage source Vin in an inductor L and to remove electrical energy from the inductor L. The switches S1 and S2 are typically power transistors and may be any suitable type of power transistor, with NMOS power transistors being illustrated for the switches in the embodiment of FIG. 1. The inductor L is coupled in series with a sense resistor Rsns between the input voltage source Vin and a phase node PH defined at the interconnection of the series-connected switches S1 and S2. An inductor current IL flowing through the inductor L also flows through the sense resistor Rsns and thus a sense voltage Vsns developed across the sense resistor in response to this current has a value indicating the inductor current flowing through the inductor.

Through the switching of the switches S1 and S2 in the switching circuit 104, electrical energy form the input voltage source Vin is stored in the inductor L and then removed from the inductor to generate an output voltage Vout on the output node OUT and an output current Iout that are supplied to an output circuit 106. The output circuit 106 includes an output capacitor Cout that filters the output voltage Vout so that this voltage has a substantially constant value during normal operating conditions of the switching voltage regulator 100. A load 108 is also shown as being part of the output circuit 106 and corresponds to electronic circuitry that is being powered by the switching voltage regulator 100. The switching voltage regulator 100 provides the output voltage Vout and a load current $I_{LD}$ to the load 108. The load 100 made would typically correspond to electronic circuitry in some sort of electronic device being powered by the switching voltage regulator 100, such as a smart phone, a tablet computer, a laptop computer, or some other type of electronic device.

During operation of the switching voltage regulator 100, the switches S1 and S2 in the switching circuit 104 are pulsed width modulated through gate drive signals $V_{GD1}$ and $V_{GD2}$ applied to respective gates of the two NMOS power transistors forming the switches. An RS latch 110 has outputs Q, Qn that are applied through drivers 112-1 and 112-2 to generate the gate drive signals $V_{GD1}$ and $V_{GD2}$, respectively. A clock circuit 114 generates a clock signal CLK that is supplied to the set input S of the latch 110. Each rising edge of the CLK signal sets the latch 110, meaning the latch drives the output Q active high and this high output is applied through the driver 112-1 to drive the gate drive signal $V_{GD1}$ high and thereby turn ON the switch S1. The output Qn is driven to the complementary logic state, namely inactive low and this low output is applied through the driver 112-2 to drive the gate drive signal $V_{GD2}$ low and thereby turn OFF the switch S2. In this state with the latch 110 set responsive to a rising edge of the CLK signal, the inductor current IL flows through the sense resistor Rsns, inductor L and turned ON switch S1 to thereby store electrical energy in the inductor.

The latch 110 remains set until an active reset signal RST from an OR gate 116 resets the latch. When reset, the latch 110 drives the output Q low and this low output is applied through the driver 112-1 to drive the gate drive signal $V_{GD1}$ low and thereby turn OFF the switch S1. The output Qn is at the same time driven high and this high output is applied through the driver 112-2 to drive the gate drive signal $V_{GD2}$ high and thereby turn ON the switch S2. In this state with the latch 110 reset responsive to the RST signal from the OR gate 116, the switch S1 is OFF and switch S2 is ON so that electrical energy stored in the inductor L results in the flow of the output current Iout through the switch S2 to the output node OUT to store energy in the output capacitor Cout and power the load 108.

The OR gate 116 activates the RST signal to reset the latch 110 as just described and thereby control the duty cycle D of the pulse width modulated gate drive signals $V_{GD1}$ and $V_{GD2}$ applied to the switches S1 and S2. The RST signal is activated responsive to either a PWM signal from a PWM comparator 118 going active high or a current limit signal CL from a current-limit comparator 120 going active high. The current-limit comparator 120 activates the CL signal when the inductor current IL through the inductor L exceeds some maximum current threshold ILMAX to thereby reset the latch 110 and thereby turn switches S1 and S2 OFF and ON, respectively, and thereby terminate the inductor current IL being supplied from the input voltage source Vin, as will be described in more detail below.

Two control loops control this pulse width modulation of the switches S1 and S2 and the overall operation of the switching voltage regulator 100: a voltage control loop and a current control loop, as will be appreciated by those skilled in the art. The operation of these two control loops will now be briefly described. The voltage control loop includes an error amplifier 122, which is typically a transconductance amplifier as illustrated in the example embodiment of FIG. 1. The error amplifier 122 receives on a first input a reference voltage Vref having a value determined by the desired output voltage VOUT of the switching voltage regulator 100. A gain circuit 146 generates a feedback voltage VFB that is derived from the actual output voltage Vout generated by the regulator 100. This VFB voltage is supplied to the second input of the error amplifier 122. In response to the difference between these two voltages (VREF−VFB), the error amplifier 122 provides an output current on the compensation node CN to thereby generate the compensation voltage VCN supplied to the PWM comparator 118. In this way, the error amplifier 122 generates the compensation voltage VCN applied to the PWM comparator 118 and controls the PWM switching of the power switches S1 and S2 based on the difference between the actual output voltage V out as indicated by VFB and the desired output voltage as indicated by VREF.

The current control loop includes a current sense amplifier 124 having inputs coupled across the sense resistor Rsns to receive a sense voltage Vsns having a value proportional to the inductor current IL through the inductor L. In response to the Vsns voltage, the current sense amplifier 124 generates a current sense voltage VCS that is proportional to the Vsns voltage and thereby the inductor current IL, and this VCS voltage is supplied to a first input of a summation circuit 126. A second input of the summation circuit 126 receives a slope compensation signal VSLC from a slope compensation circuit 128 and adds this slope compensation signal to the current sense voltage VCS to generate a current control signal VCI that is supplied to one input of the PWM comparator 118. In operation, the slope compensation circuit 128 generates the slope compensation signal VSLC responsive to the CLK signal from the clock circuit 114. The slope compensation signal VSLC ideally has a slope that is equal to the downward slope of the current sense voltage VCS, which represents the downward slope of the inductor current IL through the inductor L, as will be understood by those skilled in the art. In this way, the slope compensation signal VSLC eliminates subharmonic oscillations in the inductor current IL that can occur when the duty cycle D exceeds 50%, as previously mentioned. When the duty cycle D of the regulator 100 is less than 50%, the operation is inherently stable and thus the slope compensation circuit 128 need only provide the slope compensation signal VSLC once the duty cycle exceeds 50%, although the specific duty cycle at which the slope compensation circuit begins providing slope compensation through the slope compensation signal may vary. The slope compensation is typically provided when the duty cycle is greater than about 30% (i.e., 0.3) but such slope compensation may also be introduced starting from the beginning of the switching cycles and thus for duty cycles less than 0.3 as well. In one embodiment of the voltage regulator 100, the slope compensation circuit 128 provides the slope compensation signal VSLC from the beginning of the switch cycles and thus independent of or for all duty cycles of the voltage regulator. One skilled in the art will understand the utilization of slope compensation to prevent instability in operation of the switching voltage regulators generally and in the switching voltage regulator 100, and therefore, for the sake of brevity, the operation of the slope compensation circuit 128 will not be described in detail herein.

As previously mentioned, the switching voltage regulator 100 includes the current-limit comparator 120 that activates the current limit signal CL when the current IL through the inductor L exceeds some maximum current threshold ILMAX. In this way, the current-limit comparator 120 detects overcurrent or current-limit events and the active CL signal corresponds to the occurrence of such an event. More specifically, the current-limit comparator 120 receives the current sense voltage VCS that is proportional to the inductor current IL on one input. A reference voltage generator 130 supplies a maximum inductor current reference voltage VILMAX having a value indicating the maximum current threshold ILMAX to the other input of the current-limit comparator 120. In operation, when the inductor current IL exceeds the maximum current threshold ILMAX the current sense voltage VCS exceeds the maximum inductor current reference voltage VILMAX and the current-limit comparator 120 activates the current limit signal CL, which is applied through the OR gate 116 to reset the latch 110. As previously described, when the latch 110 is reset that latch drives the output Q low and Qn high to turn the switches S1 and S2 OFF and ON, respectively. The switches S1 and S2 turning OFF and ON, respectively, cause electrical energy stored in the inductor L to be removed through the flow of the output current Iout through the switch S2 to the output node OUT. In this way, the current-limit comparator 120 protects the inductor L and other components in the switching voltage regulator 100 by limiting the maximum current ILMAX that flows through the inductor.

The switching cycle SC of the regulator 100 is defined by the period TSC of the CLK signal from the clock circuit 114 and thus the switching cycle SC corresponds to the time between the latch 110 being set responsive to consecutive rising edges of the CLK signal. The duty cycle D of the regulator 100 is determined by when the latch 110 is reset within each switching cycle SC. Thus, assuming no overcurrent/current-limit events where the current-limit comparator 120 activates the current limit signal CL, the PWM signal from the PWM comparator 118 controls the resetting of the latch 110 each switching cycle SC and thereby controls the duty cycle D of the regulator 100. The terms "overcurrent event" or "current-limit event" are used to describe occurrences of or situations where the inductor current IL through the inductor L exceeds some maximum allowed current threshold, as mentioned above with regard to the current-limit comparator 120.

One skilled in the art will understand the overall operation of the switching voltage regulator 100 and therefore, for the sake of brevity, this operation will not be described in detail herein. Briefly, the clock circuit 114 generates the CLK signal that sets the latch 110, closing the switch S1 and opening the switch S2 to thereby store electrical energy in the inductor L. The latch 110 is then reset by either the PWM signal from the PWM comparator 118 or the current limit signal CL from the current-limit comparator 120. The reset latch 110 opens the switch S1 encloses the switch S2 causing electrical energy stored in the inductor L to generate the output current IOUT that is provided through the switch S2 to the output node OUT to thereby generate the output voltage VOUT on the output circuit 106. When the inductor current IL does not exceed the maximum inductor current ILMAX, as would be the case during normal operation of the switching voltage regulator 100, the resetting of the latch 110 is controlled by the PWM comparator 118 and in this way the PWM comparator pulse width modulates the switches S1 and S2.

The switching voltage regulator 100 could also include additional control circuitry (not shown) for controlling the overall operation of the regulator, as will be appreciated by those skilled in the art. For example, control circuitry would typically control the regulator 100 in a startup mode of operation when the regulator is first powered on to limit and gradually increase currents flowing in the regulator so as to protect components in the regulator as well as the input voltage source Vin.

Slope compensation results in the maximum current IL through the inductor L each switching cycle decreasing proportionally as the duty cycle D increases, as will be appreciated by those skilled in the art. This is undesirable because it prevents the regulator 100 from operating at its full current supplying levels at higher duty cycles. At whatever duty cycle D the slope compensation circuit 128 begins to provide slope compensation through the VSLC signal, the maximum current IL through the inductor IL will begin to decrease and will be below allowable operating levels for the regulator 100. Prior approaches to eliminate this undesirable effect of slope compensation have controlled or adjusted the value of the compensation voltage VCN based on the slope compensation being provided through the VSLC signal.

Another situation that undesirably affects the operation and performance of the switching voltage regulator 100 is the occurrence of overcurrent events. The current-limit comparator 120 detects overcurrent events as previously described. Repeated occurrence of overcurrent events over consecutive switching cycles will of course adversely affect the operation of the switching voltage regulator. For example, in such a situation the current-limit comparator 120 will reset the latch 110 and thereby shorten the duty cycle D of the regulator 100 regardless of the actual value of the output voltage Vout, which the regulator ideally maintains at a desired value. The way such overcurrent events are typically handled is performing a restart of the regulator, which has the adverse consequences of interruption in the regulation of the output voltage Vout and the need to oversize certain components of the regulator, as previously described.

In the switching voltage regulator 100, the IMAX control circuit 102 controls the compensation voltage $V_{CN}$ to reduce the occurrences of overcurrent events and the need for switching cycle interruptions (i.e., restarts and soft-starts) of the switching voltage regulator 100, as will now be described in more detail. The IMAX control circuit 102 includes IMAX control logic 134 that receives the current limit signal CL from the current-limit comparator 120 and generates an N-bit compensation count CC responsive to the current limit signal. This N-bit compensation count CC is applied to a digital-to-analog converter (DAC) 136 that generates an analog compensation control node voltage VCCN having a value based on the value of the compensation count. This analog compensation control node voltage VCCN determines the value of the compensation voltage VCN on the compensation node CN.

A clamper circuit 138 receives the analog compensation control node voltage VCCN from the DAC 136 and the clamper circuit drives or "clamps" the compensation voltage VCN based on the analog compensation control node voltage. In the embodiment of FIG. 1, the clamper circuit 138 includes an operational amplifier 140 that receives the analog compensation control node voltage VCCN on an inverting input and drives an NMOS transistor 142 coupled between the compensation node CN and ground. The non-inverting input of the clamper circuit 138 is also coupled to the compensation node CN and in this way the operational amplifier 140 generates an output that controls the NMOS transistor 142 to drive the VCN voltage on the compensation node to the value of the analog compensation control node voltage VCCN from the DAC 136. Other suitable embodiments of the clamper circuit 138 may of course be utilized as will be understood by those skilled in the art.

In operation, the IMAX control logic 134 controls the VCCN voltage applied to the clamper circuit 138 to thereby control the VCN voltage during current limit events, as will be described in more detail below. The IMAX control logic 134 does this by adjusting the value of the compensation count CC to a desired value and applying this CC count to the DAC 136 which, in turn, adjusts the VCCN voltage based on the value of the CC count. The IMAX control logic 134 sets the VCCN voltage and thereby the VCN voltage to the maximum value to which that voltage can be set without current limit events occurring, as will also be described in more detail below. When no current limit events are detected by the current-limit comparator 120, the IMAX control logic 134 sets the CC count and thereby the VCCN voltage to a maximum value, which results in the operational amplifier turning OFF or lightly driving the NMOS transistor 142 so that the error amplifier 122 drives the CN node to determine the value the VCN voltage supplied to the PWM comparator 118.

The switching voltage regulator 100 further includes a compensation network 144 coupled between the compensation node CN and ground to effectively filter the VCN voltage generated on the compensation node. In the embodiment of FIG. 1, the compensation network 144 includes a series-connected resistor R and capacitor C that function to filter the VCN voltage. More specifically, a compensation current ICN is provided by the error amplifier 122 and is effectively integrated by the RC components of the compensation network 144 to generate the compensation voltage VCN on the compensation node CN. As with the clamper circuit 138, other suitable embodiments of the compensation network 144 are of course possible as well, as will be understood by those skilled in the art.

The operation of the IMAX control logic 134 and overall operation of the IMAX control circuit 102 will now be described in more detail with reference to FIGS. 2A and 2B. FIG. 2A is a graph showing subharmonic oscillations in the inductor current IL in the switching voltage regulator 100 of FIG. 1 when a load transient occurs causing the compensation voltage VCN to abruptly increase and thereby try to force a peak inductor current higher than the allowable maximum current IMAX value, which causes IMAX events as will be described in more detail below. FIG. 2B is a graph showing the elimination of subharmonic oscillations in the inductor current in the switching voltage regulator of FIG. 1 when the maximum current control logic controls the compensation voltage and the load transient occurs. In each of these graphs the horizontal axis is time while the vertical axis is the voltage of various signals in the regulator 100 during operation, as will be described in more detail below.

FIGS. 2A and 2B illustrate a situation where a load transient LT occurs at a time t0. This load transient may correspond to a change in the load 108 of the output circuit 106 of FIG. 1, which may occur, for example, where the load is an electronic circuit that is initially coupled to the switching voltage regulator 100. Before a time t0, the value of the compensation voltage VCN on the compensation node CN is controlled by the error amplifier 122. This is the case during normal operation of the regulator 100 when the current-limit comparator 120 detects no current limit events and accordingly drives the current limit signal CL inactive.

FIG. 2A depicts a situation where the value of the compensation voltage VCN changes rapidly starting at time T0 in response to the load transient LT. The compensation voltage VCN then remains constant for the remainder of the time period shown in the figure during which the clamper circuit 138 clamps the compensation voltage at the illustrated value. The error amplifier 122 would then again control the VCN voltage after the period shown in FIG. 2A. Thus, FIG. 2A illustrates the situation where the IMAX control circuit 102 does not control the VCN voltage and this voltage is controlled in a conventional way by a conventional clamping circuit to illustrate the instability that may arise through such an approach. Prior to the time t0 when the load transient LT occurs the voltage regulator 100 is operating normally with no current limit events. This is illustrated through the three signals shown in the signal timing diagram of FIG. 2A. Referring to FIGS. 1 and 2A, the solid line in FIG. 2A is the compensation voltage VCN, the dotted line is the current control signal VCI output from the summation circuit 126, and the dashed line is the current sense voltage VCS output from the current sense amplifier 124 which indicates the inductor current IL through the inductor L. As seen before the time t0, the current sense voltage VCS is a ramp waveform corresponding to the inductor current IL through the inductor L as the switches S1 and S2 are turned ON and OFF each switching cycle. The compensation voltage VCN is maintained at a relatively constant value by the error amplifier 122. The current control signal VCI is the current sense voltage VCS plus the slope compensation signal VSLC. These signals VCN, VCI and VCS are stable as illustrated in FIG. 2A before the time t0.

At the time T0, the load transient LT occurs and as seen in FIG. 2A the current sense voltage VCS begins to ramp up as the inductor current IL increases in response to the load transient. The compensation voltage VCN also increases to the clamped or fixed value illustrated in the figure. The upward ramp of the current control signal VCI resulting from the increasing current sense voltage VCS summed with the slope compensation signal VSLC is seen in the figure after the time T0. Unwanted subharmonic oscillations of the inductor current IL and therefore the current sense voltage VCS are seen for the VCS and VCI signals in FIG. 2A after the time T0. Thus, if the compensation voltage VCN is merely allowed to increase and clamped at a constant value these unwanted subharmonic oscillations can occur in the switching voltage regulator 100 in response to the load transient LT.

FIG. 2B depicts the operation of the IMAX control circuit 102 in adjusting the value of the compensation voltage VCN in response to the load transient LT to provide stable operation of the switching voltage regulator 100, as will now be described in more detail with reference to FIGS. 1 and 2B. Once again, prior to the time t0 when the load transient LT occurs the voltage regulator 100 is operating normally with no current limit events. The solid line in FIG. 2B is again the compensation voltage VCN, the dotted line the current control signal VCI, and the dashed line the current sense voltage. Once again, before the time t0, the current sense voltage VCS is a ramp waveform corresponding to the inductor current IL through the inductor L as the switches S1 and S2 are turned ON and OFF each switching cycle. The compensation voltage VCN is again maintained at a relatively constant value by the error amplifier 122 while the current control signal VCI is the current sense voltage VCS plus the slope compensation signal VSLC. These signals VCN, VCI and VCS are again stable as illustrated in FIG. 2B before the time t0.

At the time T0, the load transient LT occurs and as seen in FIG. 2B the current sense voltage VCS begins to ramp up just as in FIG. 2A as the inductor current IL increases in response to the load transient. Also in response to the load transient LT, the compensation voltage VCN increases initially to some maximum value as illustrated in FIG. 2B, where the maximum value of VCN is set by the analog compensation control voltage VCCN output by the DAC 140. This occurs because in response to the load transient LT the output voltage VOUT decreases, which causes the error amplifier 122 to drive the compensation voltage VCN high until the clamper circuit 138 turns ON to thereby limit or clamp the compensation voltage to the value of the analog compensation control voltage VCCN (i.e., VCN=VCCN).

As the current sense voltage VCS increases and then exceeds the maximum inductor current reference voltage VILMAX (i.e., meaning the inductor current IL exceeds the maximum allowable threshold for the inductor current), the current-limit comparator 120 activates the current limit signal CL, indicating the occurrence of a current limit event. The IMAX control circuit 102 is activated in response to the CL signal going active (i.e., in response to the current limit event) and thereafter controls the VCN voltage as illustrated in FIG. 2B to eliminate subharmonic oscillations of the inductor current IL. More specifically, between the time t0 when the load transient LT occurs and a time t1 the IMAX control logic 134 decrements the compensation count CC that is applied to the DAC 135 to thereby control the value of the analog compensation control node voltage VCCN. The clamper circuit 138 drives the VCN voltage on the compensation node CN to the VCCN voltage from the DAC 136. This is true because the operational amplifier 140 in the clamper circuit 138 drives the drives the transistor 142 to set the VCN voltage at its non-inverting input to the VCCN voltage at its inverting input. The IMAX control logic 134 continues decrementing the CC count until the VCCN voltage from the DAC causes the clamper circuit 138 to drive the VCN voltage to the value that eliminates the occurrence of current limit events, which occurs just after the time t1 in FIG. 2B. The operation of the voltage regulator 100 is seen in FIG. 2B as again being stable after time t1, with the VCS and VCI voltages having the same form as during the stable operation prior to t0 except around a new higher average inductor current IL due to the increased load on the regulator 100 resulting from the load transient LT.

Figure 3:
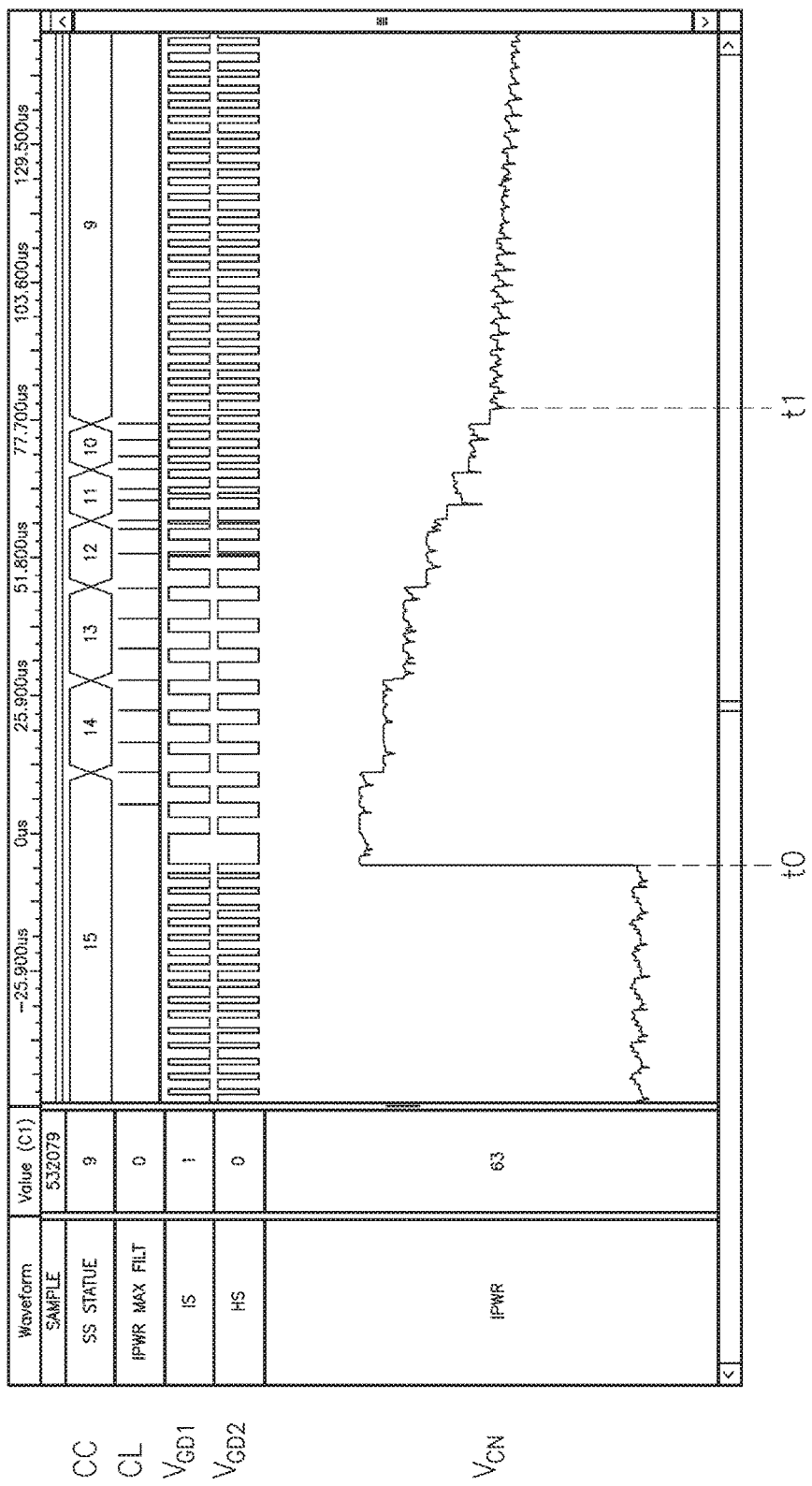
FIG. 3 is a signal timing diagram illustrating various signals in the switching voltage regulator and the IMAX control circuit of FIG. 1 during operation when a load transient occurs.

The detailed operation of the IMAX control circuit 102 will be now be described in more detail with reference to FIGS. 3 and 4. FIG. 3 is a signal timing diagram illustrating various signals in the switching voltage regulator 100 and the IMAX control circuit 102 of FIG. 1 during operation when a load transient LT occurs. FIG. 3 shows again show the compensation voltage VCN in the lowermost signal, where this signal corresponds to the same signal in FIG. 2B with the load transient LT occurring at a time t0 and stable operation of the regulator 100 again occurring just after a time t1. The uppermost signal in FIG. 3 is the compensation count CC generated by the IMAX control logic 134 in response to the current limit signal CL, where the CL signal is shown as the next signal down in FIG. 3. The next two signals under the CL signal are the gate drive signals applied to the switches S1 and S2 as discussed above with regard to FIG. 1. These drive signals $V_{GD1}$ and $V_{GD2}$ illustrate switching cycles of the voltage regulator 100. As discussed above, the switching cycle of the regulator 100 is defined by the time between the latch 110 being set while the duty cycle D is determined by when the latch 110 is reset within each switching cycle and thus corresponds to the portion of each switching cycle for which the gate drive signal $V_{GD1}$ is active high to turn ON the switch S1.

The operation of the voltage regulator 100 in FIG. 3 mirrors that shown in FIG. 2B except FIG. 3 additionally shows the operation of the IMAX control logic 134 in decrementing the compensation count CC responsive to current limit events as indicated by the current limit signal CL. The gate drive signals $V_{GD1}$ and $V_{GD2}$ show the switching cycles of the voltage regulator 100 during stable operation before time t0 and after time t1 as well as during the period between t0 and t1 during which the IMAX control logic 134 adjusts the value of the CC count to thereby adjust the VCN voltage to eliminate the occurrence of current limit events, as will now be described in more detail.

Before the time t0, which is during normal operation of the regulator 100 where no current limit events are occurring, the IMAX control logic 134 provides a maximum compensation count CC to the DAC 136 which limits the maximum value of the compensation voltage VCN that can be generated on the CN node when a load transient LT occurs. After the load transient LT at time t0, the IMAX control logic 134 begins decrementing the CC count responsive to current limit events as indicated by the CL signal from the current-limit comparator 120 (FIG. 1). As seen in FIG. 3, a current limit event occurs each switching cycle from the time t0 to the time t1. The IMAX control logic 134 decrements the CC count after the occurrence of a number certain number of current limit events (i.e., after a certain number of pulses of the CL signal). This operation will be described in more detail with reference to FIG. 4.

As seen in FIG. 3, after each occurrence of a certain number of pulses of the CL signal (i.e., after a certain number of current limit events), the IMAX control logic 134 decrements the CC count. The CC count is supplied to the DAC 136 which, in turn, generates the VCCN signal that sets the compensation voltage VCN as previously discussed. Thus, as seen between times t0 and t1 as the IMAX control logic 134 decrements the CC count the VCN voltage decreases. The integer value of the CC count is shown in FIG. 3, with the count value being 15 before time t0, then being decremented to 14 shortly after t0, then decremented to 13, and so on until the count is decremented to 9 at approximately the time t1. As seen after the time t1, no more CL signal pulses occur meaning no more current limit events occur and the operation of the regulator 100 is once again stable, as discussed with reference to FIG. 2B after time t1 in that figure.

After controlling the CC count to stabilize the operation of the regulator 100 by eliminating the occurrence of current limit events, the IMAX control logic 134 will occasionally increment the CC count to see if the value of the count can be incremented without resulting in the occurrence of current limit event, as will be explained in more detail below with reference to FIG. 4. In this way, the IMAX control logic 134 sets the CC count and thereby the maximum allowed voltage VCN on the CN node to the maximum value that does not result in current limit events. Ideally the IMAX control logic 134 would increment the CC count back to some maximum value, with the maximum value being 15 in the example of FIG. 3. The VCN voltage is ideally maintained at the maximum value that does not result in current limit events because this then ensures that the regulator 100 provides the maximum inductor current IL without triggering current limit events. The operation of the IMAX control logic 134 also reduces the need to restart the voltage regulator 100 due to current limit events and the need to perform the associated soft-start operation associated with such restart and the adverse consequences of such operation as previously discussed.

Figure 4:
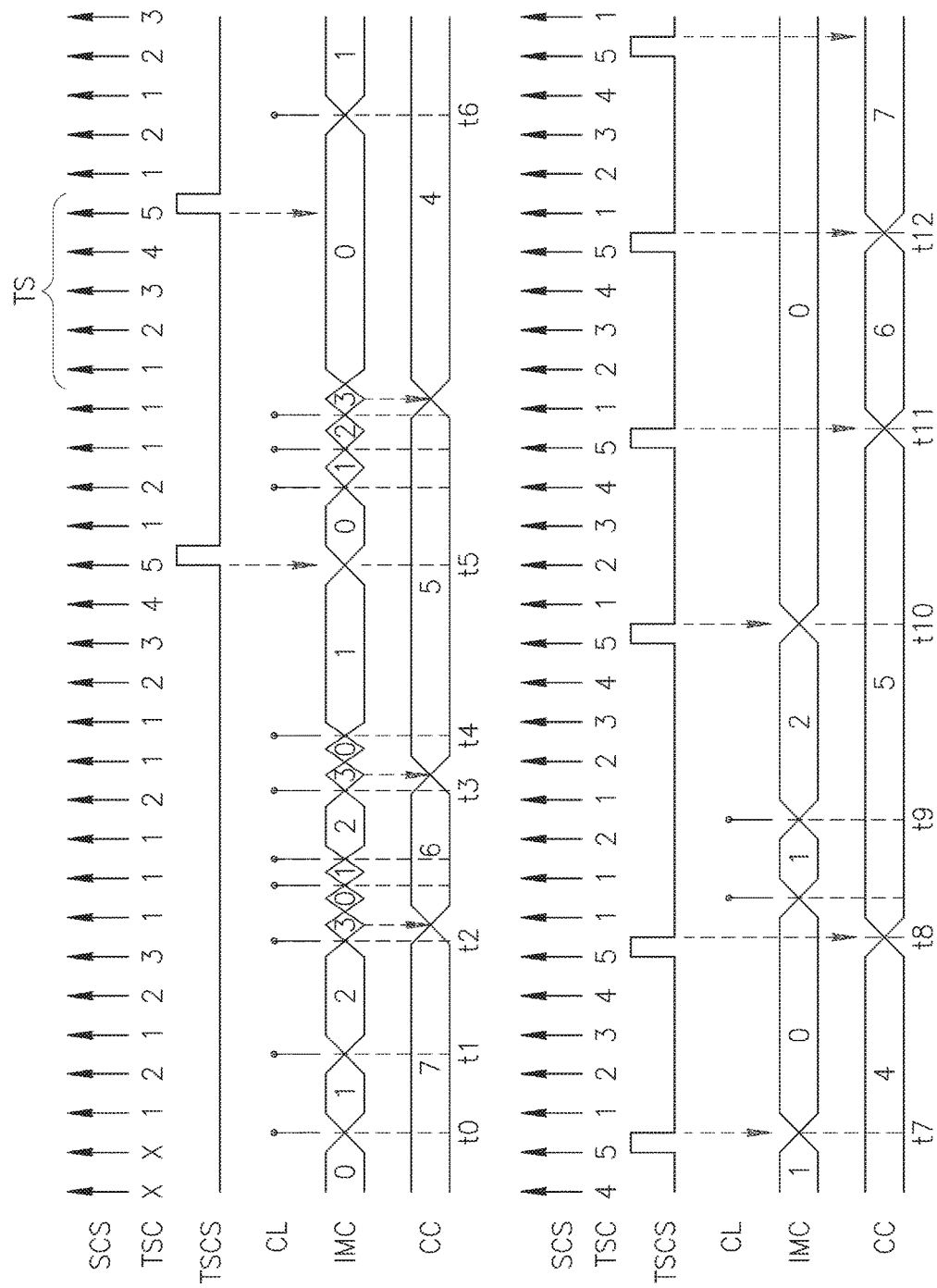
FIG. 4 is a more detailed signal timing diagram illustrating various signals generated by the IMAX control logic of FIG. 1 during operation of the switching voltage regulator.

FIG. 4 is a more detailed signal timing diagram illustrating various signals generated by the IMAX control logic 134 of FIG. 1 during operation of the switching voltage regulator 100. There are five signals shown in FIG. 4, some of which are internal signals generated by the IMAX control logic 134. FIG. 4 shows the same five signals in the top and bottom portions of the figure, with the bottom portion being a continuation from the top portion along the horizontal axis, which represents time. The vertical axis represents different things for different ones of these signals, as will now be explained in more detail.

The uppermost signal in each portion is a switching cycle signal SCS that represents switching cycles SC of the voltage regulator 100. Recall, as discussed above, a switching cycle SC of the regulator 100 is determined by the period TSC of the CLK signal and the associated switching of the switches S1 and S2. Each up-arrow in FIG. 4 for the SCS signal simply represents the occurrence of a switching cycle SC of the regulator 100. The next signal below the switching cycle signal SCS is a time step count TSC that indicates the occurrence of a switching cycle SC during a time step threshold or simply a time step TS utilized by the IMAX control logic 134 during operation. The time step TS is a programmable time constant that is defined for the operation of the IMAX control logic 134. In the embodiment of FIG. 4, the time step TS is defined in terms of an integer number N of switching cycles SC of the regulator 100. Thus, the time step TS=(N×SC). The time step TS equals five (i.e., N=5) switching cycles SC in the example of FIG. 4 as shown in the upper right of the figure, but N may of course vary in different embodiments of the IMAX control logic 134.

By making the time step TS a function of the switching cycle SC of the regulator 100, if the switching frequency fs=(1/TSC) changes, then the value of the time step TS that the IMAX control logic 134 utilizes changes accordingly. Recall, as discussed above the period TSC of the CLK signal defines the switching cycle SC of the regulator 100. When the switching frequency fs changes, there would be more or fewer current-limit events within a given unit of time. By making the time step TS a function of the switching cycle SC the algorithm implemented by the IMAX control logic 134 varies as a function of the switching frequency fs. This would typically be desirable as it would maintain the same number of current-limit events utilized by the IMAX control logic 134 for controlling the regulator 100 independent of the switching frequency fs of the regulator. In other embodiments, however, the time step TS is programmable or adjustable to a desired value independent of the switching cycle SC of the regulator 100. Thus, the time step TS may be constant, may be adjustable independent of the switching frequency fs, or may be a function of the switching frequency fs of the voltage regulator 100.

The next signal under the SCS signal in FIG. 4 is a time step count TSC. The IMAX control logic 134 increments the value of the time step count TSC during each switching cycle SC of the regulator 100. The IMAX control logic 134 also resets the TSC count to 1 in response to: 1) the TSC count reaching a maximum value, which is five (5) in the example of FIG. 4; or 2) when a current-limit event is detected as indicated by an activation pulse of the current limit signal CL as shown in FIG. 4. In one embodiment, a counter (not shown) in the IMAX control logic 134 is asynchronously reset to thereby reset the TSC count to 0 and then the TSC count is synchronously incremented to 1 responsive to the switching clock at the beginning of the next switching cycle SCS. A time step TS complete signal TSCS is shown between the TSC count and the CL signal. The TSCS signal indicates the occurrence of a time step TS, which occurs when there is no current-limit event ((i.e., pulse of the CL signal) for the number N of switching cycles SC contained in the time step TS. Thus, in the upper right of FIG. 4 where the time step TS is illustrated, the TSC count is incremented by the IMAX control logic 134 from 1 to 5 and then when TSC=5 the IMAX control logic activates the TSCS signal by pulsing this signal active. Thus, whenever the IMAX control logic 134 generates a pulse of the TSCS signal this indicates there has been no current-limit events as indicated by the CL signal for the N number of switching cycles SC contained in the time step TS.

FIG. 4 also shows a maximum inductor current ILMAX count designated IMC that is an internal count value generated by the IMAX control logic 134. The IMAX control logic 134 increments the IMC count up to some maximum value in response to each current-limit event (i.e., pulse of the CL signal). The IMAX control logic 134 resets the IMC count to zero (0) in response to the count reaching the maximum value, which is three (3) in the example of FIG. 4. In addition, the IMAX control logic 134 also resets the IMC count in response to the TSCS signal going active, which occurs when there has been no current-limit event for N switching cycles SC as previously discussed. Finally, also illustrated in FIG. 4 is the compensation count CC which is an N-bit digital signal generated by the IMAX control logic 134 as previously discussed with reference to FIG. 1. The IMAX control logic 134 decrements the compensation count CC in response to the IMC count reaching the maximum value, which again is 3 in the example of FIG. 4. Additionally, the IMAX control logic 134 also increments the value of the CC count based on the IMC count and the TSCS signal, as will be described in more detail below.

The overall operation of the IMAX control logic 134 in controlling the compensation voltage VCN to eliminate overcurrent or current-limit events of the regulator 100 without requiring restarts of the regulator will now be described in more detail with reference to FIG. 4. In operation, the IMAX control logic 134 detects whether a current-limit event has occurred each switching cycle SC. Once again, as already mentioned above, a current-limit event indicates that the inductor current IL through the inductor L exceeds the maximum current threshold ILMAX. Current-limit events are represented as vertical lines for the current-limit signal CL in FIG. 4 and in the following description each such current-limit event will simply be referred to as a current-limit event CL for ease of description.

Initially, at just before a time T0 the maximum inductor current count IMC is zero and the compensation count CC has a value of 7 (assumed initial value for the count CC by way of example). A current-limit event CL occurs at the time T0 and in response the IMAX control logic 134 increments the IMC count from 0 to 1. In this way, the IMAX control logic 134 utilizes the IMC count to keep track of the number of current-limit events CL that occur during switching cycles SC of operation of the regulator 100. Also in response to the current-limit event CL at the time T0, the IMAX control logic 134 resets the time step count TSC to 1. The TSC count is in this way utilized by the IMAX control logic 134 to track the number of consecutive switching cycles SC for which no current-limit event CL has occurred. The IMAX control logic 134 increments the TSC count each switching cycle that no current-limit event CL is detected and resets the TSC count to 1 each switching cycle SC that a current-limit event is detected.

In the example of FIG. 4, at a time T1 another current-limit event CL is detected and in response to this current-limit event the IMAX control logic 134 increments the IMC count to 2 and resets the TSC count to 1. Note that between the times T0 and T1 a switching cycle SC occurs for which no current-limit event CL is present and thus the IMAX control logic 134 increments the TSC count to 2 during this interval. The TSC count is then reset from 2 to 1 in response to the current-limit event CL at the time T1. After the time T1 there is no current-limit event CL for the next two switching cycles SC so the IMAX control logic 134 increments the TSC count to 2 and then to 3 just before a time T2. At the time T2, the IMAX control logic 134 detects another current-limit event CL and in response to this current-limit event the control logic increments the IMC count to 3 and resets the TSC count to 1.

When the IMAX control logic 134 increments the IMC count to 3 at the time T2, the control logic also adjusts the value of the compensation count CC and resets the IMC count to zero. More specifically, the IMAX control logic decrements the compensation count CC in response to the IMC count reaching the maximum value of 3. As seen in FIG. 4, the CC count is decremented from 7 to 6. This results in the DAC 136 of FIG. 1 reducing the value of the analog compensation control node voltage VCCN generated by the DAC. This reduced VCCN voltage reduces the VCN voltage supplied to the PWM comparator 118, which will lower the duty cycle D of the regulator 100 in an attempt to lower the ILMAX current through the inductor L and thereby eliminate the occurrence of current limit events CL. The IMAX control logic 134 uses the IMC count to track the occurrence of CL events and decrements the compensation count CC to thereby adjust the VCCN voltage whenever the IMC count reaches its maximum value (i.e., 3 in the example of FIG. 4). In this way, the IMAX control logic 134 uses the detection of CL events and the IMC count to decrement the CC count until the CL events are eliminated for a set number of switching cycles, where this set number of switching cycles corresponds to the time step TS, as will be described in more detail below.

After the time T2, as seen in FIG. 4 several CL events are subsequently detected and the IMAX control logic 134 increments the IMC count and resets or increments the TSC count in the same way as just described up until a time T3. At the time T3, another current-limit event CL is detected which is the third such event to occur without five consecutive switching cycles SC without a such an event (i.e., a CL event has occurred without the programmable time step TS having lapsed). In response to this current-limit event CL, the IMAX control logic 134 increments the IMC count to 3 and resets the TSC count to 1. As a result of the IMC count being equal to 3, the IMAX control logic 134 also decrements the value of the compensation count CC from 6 to 5 and resets the IMC count to zero just after time T3. The new lower compensation count CC results in the DAC 136 (FIG. 1) again reducing the value of the analog compensation control node voltage VCCN to thereby reduce the VCN voltage supplied to the PWM comparator 118 and lower the duty cycle D of the regulator 100 still further in an attempt to lower the ILMAX current through the inductor L and thereby eliminate the occurrence of current limit events CL.

After the time T3 another CL event occurs at a time T4 and IMAX control logic 134 accordingly resets the IMC and TSC counts. After the time T4, however, no CL event occurs until a time T5 where the duration (T5-T4) corresponds to the time step TS. Thus, at the time T5 the IMAX control logic 134 pulses the time step TS complete signal TSCS active high, which resets the IMC count which had been incremented to 1 at the time T4 back to zero. When consecutive time steps TS occur as indicated by back-to-back pulses of the TSCS signal the IMAX control logic 134 increments the value of the CC count, as will be described in more detail below.

The IMAX control logic 134 continues operating in the manner just described in response to CL events and active pulses of the TSCS signal upon the completion of time steps TS. In this way, the IMAX control logic 134 continues decrementing the CC count in response to the occurrence of CL events in an attempt to eliminate these CL events. Each time the CC count is decremented the DAC 136 (FIG. 1) again reduces the value of the analog compensation control node voltage VCCN to thereby reduce the VCN voltage supplied to the PWM comparator 118 and lower the duty cycle D of the regulator 100. The duty cycle D is lowered in an attempt to lower the ILMAX current through the inductor L and thereby eliminate the occurrence of current limit events CL.

At a time T6, a CL event occurs and so the IMC count is incremented to 1 and then no CL event is detected for a time step TS which occurs at a time T7. Accordingly, at the time T7 the IMC count is reset to 0 and the TSC count reset to 1 in response to the active pulse of the TSCS signal. After the time T7 another time step TS occurs at a time T8 and the second time step between the times T7-T8 is a second consecutive time step, meaning no CL events have occurred for two consecutive time steps. As a result, at the time T8 the IMAX control logic 134 again pulses the TSCS signal active causing the TSC count to be reset to 1 and the IMC count to be reset to zero (note the IMC count already has the value of 0 at the time T8). In addition, because this active pulse of the TSCS signal at the time T8 indicates a second consecutive time step TS, the IMAX control logic 134 also increments the value of the CC count at the time T8.

The IMAX control logic 134 increments the value of the compensation count CC from 4 to 5 in the example of FIG. 4. The new higher compensation count CC results in the DAC 136 (FIG. 1) increasing the value of the analog compensation control node voltage VCCN to thereby increase the VCN voltage supplied to the PWM comparator 118 and increase the duty cycle D of the regulator 100 in an attempt to increase the ILMAX current through the inductor L to a higher value. In this way, when the IMAX control logic 134 determines that current-limit events CL are no longer occurring the control logic attempts to increase the duty cycle D and thereby the ILMAX current through the inductor L that the regulator 100 is providing. This way the maximum inductor current ILMAX through the inductor L is not set at a lower value than is necessary to prevent the occurrence of current-limit events CL.

In FIG. 4, two CL events occur after the time T8, with the second occurring at a time T9, and then no further current-limit events are detected for the time step TS which occurs at a time T10. Thus, the time from T9 to T10 corresponds to the time step TS and at the time T10 the IMAX control logic 134 pulses the TSCS signal active causing the TSC and IMC counts to be reset to 1 and 0, respectively, as previously described. Because this is only the first time step TS that has transpired after the occurrence of the most recent current-limit event CL at the time T9, the IMAX control logic 134 does not increment the value of the CC count at the time T10. After the time T10 at a time T11, another time step TS occurs, meaning no current-limit events CL were detected during this interval. As a result, at the time T11 the IMAX control logic 134 increments the value of the compensation count CC from 5 to 6 since this is the second consecutive time step TS during which no current-limit events CL were detected. The new higher compensation count CC results in the DAC 136 (FIG. 1) increasing the value of the analog compensation control node voltage VCCN to thereby increase the VCN voltage supplied to the PWM comparator 118 and increase the duty cycle D of the regulator 100 to further increase the ILMAX current through the inductor L to a higher value. Finally, at a time T12 another time step TS occurs, meaning no current-limit events CL were detected during the interval from the time T11 to T12. Note that this time step TS occurring between the times T11 and T12 is the third consecutive time step for which no current-limit event CL were detected. As a result, at the time T12 the IMAX control logic 134 once again increments the value of the compensation count CC this time from 6 to 7 and this will result in the increased duty cycle D and ILMAX current provided by the regulator as previously described. In operation, the IMAX control logic 134 increments the CC count up to some maximum value upon the occurrence of each time step TS after the second consecutive time step is detected. In other words, upon the occurrence of two consecutive time steps TS the IMAX control logic 134 begins incrementing the value of the compensation count CC and will increment this compensation count up to the maximum value upon the occurrence of subsequent time steps TS so long as no current-limit events CL are detected. In the example embodiment of FIG. 4, two subsequent TSCS events or pulses occur before the first increment of the compensation count CC, and thereafter the compensation count CC is incremented every TSCS event or pulse. This particular functionality of the IMAX control logic 134 is programmable, however, so the specific number of TSCS events associated with incrementing of the CC count can be adjusted to realize different response times of the control loop including the IMAX control circuit 102 in the voltage regulator 100.

Referring to FIGS. 1 and 4, as seen from the above description of the IMAX control logic 134, the control logic monitors the current-limit events CL that occur as a result of current IL through the inductor L exceeding the maximum ILMAX. If the current IL through the inductor IL is above the maximum threshold ILMAX, then a maximum current or "current-limit" event CL is generated on each switching cycle SC for which this is true. The IMAX control logic 134 controls the clamping of the compensation voltage VCN by the clamper circuit 138 as a function of the detected current-limit events CL. In controlling the value of the VCN voltage, the IMAX control logic 134 adjust the clamped value of this voltage in an attempt to exit loop instability of the voltage regulator 100, which generally is present when exceeding the maximum current ILMAX is allowed current. By lowering the value of the clamped voltage VCN on the compensation node CN, a stable operating condition of the voltage regulator 100 should be achieved where no more current-limit events CL occur. After a certain amount of time of the voltage regulator 100 operating in a stable condition, meaning no current-limit events CL occur, the IMAX control logic 134 starts increasing the value of the clamped compensation voltage VCN back to its normal operating value. If, while doing so, current-limit events CL again start occur indicating (IL>ILMAX) then the IMAX control logic 134 will stop increasing and may again lower the clamped compensation voltage VCN and if necessary to put the voltage regulator 100 in a stable operating condition where IL is not exceeding ILMAX and thereby triggering current-limit events. The IMAX control logic 134 control eliminates the need for or reduces the need to interrupt the switching cycles of the regulator 100, such as occur during restart and soft-start operating modes as previously described. This eliminates the negative effects on the operation of the voltage regulator 100 that could otherwise result from such interruptions of the switching cycles during operation of the regulator, as were also previously described.

Figure 5:
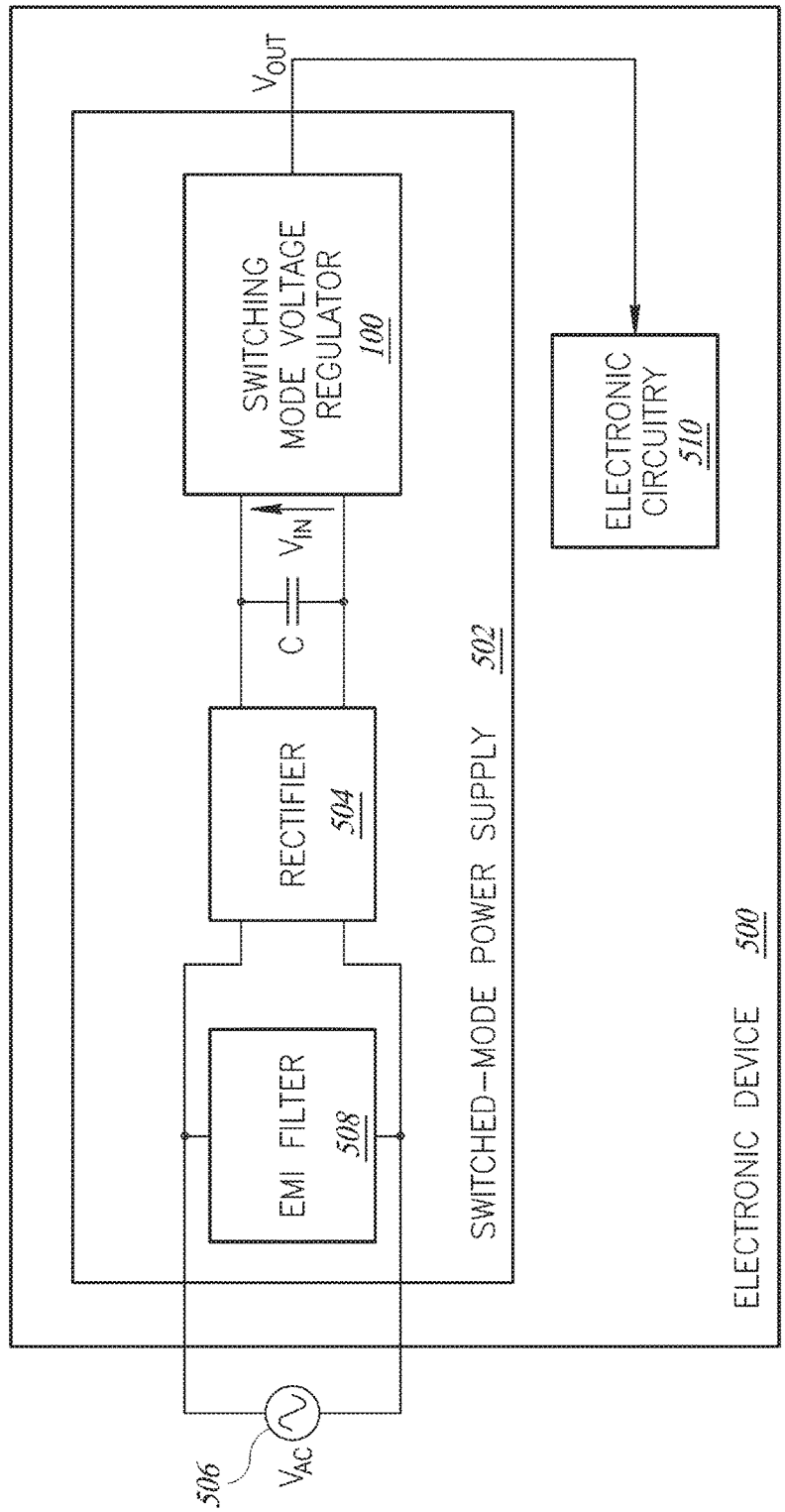
FIG. 5 is a functional block diagram of an electronic device including a switched-mode power supply containing the switching voltage regulator of FIG. 1 according to an embodiment of the present disclosure.

FIG. 5 is a functional block diagram of an electronic device 500 including a switched-mode power supply 502 containing the switching voltage regulator 100 of FIG. 1 according to one embodiment of the present disclosure. The switched-mode power supply 502 includes a rectifier circuit 504, such as a diode-bridge, connected to an electrical mains power supply 506. An electromagnetic interference filter 508 is connected across the electrical mains power supply 506 to suppress unwanted noise that may be present on the electrical mains power supply, as will be appreciated by those skilled in the art. The rectifier 504 rectifies the filtered AC signal from the supply 506 and provides this rectified signal across a capacitive element C to generate the input voltage VIN that is supplied to the switching mode voltage regulator 100. The switching mode voltage regulator 100 operates as described above with reference to FIGS. 1-4 to generate the output voltage VOUT and supplies this output voltage to electronic circuitry 510 in the electronic device 500.

The structure and function of the electronic circuitry 510 will of course vary depending on the type of electronic device 500. Where the electronic device 500 is a desktop computer, for example, the electronic circuitry 510 would typically include display, processor, memory, interface, and power management circuitry. The power management circuitry could contain a battery that is charged by the output voltage VOUT. In other embodiments, the input voltage VIN supplied to the regulator 100 could be provided from a battery contained in the electronic circuitry 510, with the regulator then generating the VOUT voltage from this input voltage and providing the output voltage to power other circuitry in the electronic circuitry.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit configured to control switching circuitry of a switching converter and to detect current-limit events indicating a maximum current threshold of an inductive element of the switching circuitry has been reached, the control circuit configured to adjust a value of a compensation voltage in response to the detected current-limit events, wherein the compensation voltage defines a duty cycle of the switching converter and the control circuit further is configured to detect a time for which no current-limit events have been detected and to adjust the value of the compensation voltage to increase the duty cycle of the switching converter in response to the detected time reaching a time step threshold.

2. The control circuit of claim 1, wherein the control circuit is further configured to generate a current limit pulse signal in response to each detected current-limit event.

3. The control circuit of claim 1 further comprising a compensation node on which the compensation voltage is provided and a compensation network coupled between the compensation node and a reference node and configured to filter the compensation voltage.

4. The control circuit of claim 3, wherein the compensation network comprises a series-connected resistive element and capacitive element.

5. The control circuit of claim 1, wherein the time step threshold is one of a fixed value and a variable value that is programmable.

6. The control circuit of claim 5, wherein the time step threshold is a variable value that programmable to an integer number of switching cycles of the switching converter.

7. The control circuit of claim 1, wherein the control circuit is further configured to increment a value of the compensation voltage responsive to the detected time reaching the time step threshold.

8. The control circuit of claim 7, wherein the control circuit is configured to:
    detect the occurrence of two consecutive occurrences of the detected time reaching the time step threshold; and
    after the occurrence of two consecutive occurrences of the detected time reaching the time step threshold is detected, to increment the value of the compensation voltage responsive to the each subsequent occurrence of the detected time reaching the time step threshold.

9. The control circuit of claim 1, wherein the control circuit is further configured to:
    increment a maximum inductive element current count in response to the detection of each current-limit event;
    decrement a value of the compensation voltage responsive to the maximum inductive element current count reaching a threshold value; and
    reset the maximum inductive element current count responsive to the maximum inductive element current count reaching the threshold value.

10. A switching voltage regulator, comprising:
    switching circuitry including an input node configured to receive an input voltage and including a switching element coupled to an inductive element, the switching circuitry configured to control switching of the switching element responsive to a drive signal to generate an output voltage on an output node; and
    a control circuit configured to detect current-limit events indicating a current through the inductive element has reached a maximum inductor current threshold, and configured to generate the drive signal based on a compensation voltage to control a duty cycle of the switching voltage regulator and an inductor current supplied on the output node to eliminate the occurrence of current-limit events, the current control circuit further configured to detect whether a time for which no current-limit events have been detected reaches a time step threshold and to control the compensation voltage to increase the duty cycle responsive to the time reaching the time step threshold.

11. The switching voltage regulator of claim 10, wherein the switching circuitry has a buck converter topology.

12. The switching voltage regulator of claim 10, wherein the switching circuitry has a buck boost converter topology.

13. The switching voltage regulator of claim 10 further comprising an output capacitor coupled to the output node of the switching circuitry.

14. The switching voltage regulator of claim 10, wherein the drive signal is a pulse width modulated signal.

15. The switching voltage regulator of claim 10, wherein the control circuit further comprises:
    an RS latch having a set input configured to receive a clock signal, a reset input, and an output coupled to the switching element to provide the drive signal to the switching element;
    a PWM comparator having a first input configured to receive the compensation voltage, a second input configured to receive a current control signal, and an output coupled to the reset input of the RS latch; and
    a slope compensation circuit having an input configured to receive the clock signal and an output coupled to the second input of the PWM comparator, the slope compensation circuit configured to generate a slope compensation signal responsive to the clock signal to adjust a value of the current control signal.

16. A method, comprising:
    detecting current-limit events indicating a maximum current threshold of a switching converter has been reached;
    adjusting a value of a compensation voltage in response to the detected current-limit events, the compensation voltage defining a duty cycle of the switching converter;
    detecting a time for which no current-limit events have been detected; and
    adjusting the value of the compensation voltage in response to the detected time reaching a time step threshold.

17. The method of claim 16, wherein adjusting the value of the compensation voltage comprises adjusting the value of the compensation voltage to increase the duty cycle of the switching converter, and wherein the time step threshold is one of a fixed value and a programmable value.

18. The method of claim 17, wherein the time step threshold is a programmable value that is set to an integer number of switching cycles of the switching converter.

19. The method of claim 16, wherein adjusting the value of the compensation voltage comprises incrementing a value of the compensation voltage responsive to subsequent occurrences of the detected time reaching the time step threshold.

20. The method of claim 19, wherein incrementing the value of the compensation voltage responsive to subsequent occurrences of the detected time reaching the time step threshold comprises:
    detecting the occurrence of two consecutive occurrences of the detected time reaching the time step threshold; and
    after detecting the occurrence of two consecutive occurrences of the detected time reaching the time step threshold, incrementing the value of the compensation voltage responsive to the each subsequent occurrence of the detected time reaching the time step threshold.

* * * * *